United States Patent [19]

Rand

[11] Patent Number: 4,833,333

[45] Date of Patent: May 23, 1989

[54] SOLID STATE LASER Q-SWITCH HAVING RADIAL COLOR CENTER DISTRIBUTION

[75] Inventor: Stephen C. Rand, Agoura, Calif.

[73] Assignee: Hughes Aircraft Company, Los Angeles, Calif.

[21] Appl. No.: 74,666

[22] Filed: Jul. 17, 1987

[51] Int. Cl.[4] .............................................. G21K 5/00
[52] U.S. Cl. .............................. 250/492.3; 250/492.1; 372/11; 372/42
[58] Field of Search .......................... 250/492.3, 492.1; 372/42, 10, 11, 73, 74

[56] References Cited

U.S. PATENT DOCUMENTS

| | | | |
|---|---|---|---|
| 4,519,082 | 5/1985 | Schneider | 372/42 |
| 4,644,550 | 2/1987 | Csery et al. | 372/40 |
| 4,672,619 | 6/1987 | Luty et al. | 372/68 |

OTHER PUBLICATIONS

818423, Derwent's abstract, Aug. 16, 1979.

*Primary Examiner*—Janice A. Howell
*Assistant Examiner*—John A. Miller
*Attorney, Agent, or Firm*—Wanda K. Denson-Low; A. W. Karambelas; V. G. Laslo

[57] ABSTRACT

A passive laser Q-switch is fabricated from a crystal which can form saturable color centers, such as lithium fluoride. The arbitrarily long crystal is irradiated with electrons from the side, or radially, to impart a radial distribution of saturable color centers therein, with the highest density at the periphery of the crystal. Optionally, the crystal can also be irradiated axially with electrons or in any direction with another form of radiation having greater penetration into the crystal, such as gamma radiation, to establish a base level of saturable color centers throughout the crystal. The crystal having the radial distribution of color centers acts as a Q-switch, but additionally tends to reduce beam divergence and increase the brightness of the laser beam by virtue of the nonlinear bleaching mechanism.

6 Claims, 2 Drawing Sheets

SOLID STATE LASER Q-SWITCH HAVING RADIAL COLOR CENTER DISTRIBUTION

Background of the Invention

This invention relates to lasers, and, more particularly, to a solid state Q-switch for intensifying the peak power attained in pulsed operation of a laser.

A laser is a device which produces a beam of coherent light. In a typical laser, an incoherent light source imparts energy to a lasing medium, which produces light having only a single wavelength, termed coherent light, through particular electron transitions. Where the lasing medium is properly designed, the coherent light is emitted as a beam. In certain cases, it is desirable that the emitted beam of coherent light be more intense than naturally occurs from the lasing medium, and a type of laser termed a Q-switched, pulsed laser has been developed for this purpose.

The pulsed laser contains a light controller termed a Q-switch which limits the buildup of light reflecting back and forth within the laser until it reaches some selected value, at which time the growth of the internal wave rapidly inceases and the threshold for laser action is reached. After releasing the built-up light energy as a pulse, the Q-switch recovers to its prior function of restraining the light energy until the intensity is high enough for another pulse. Very high beam energies can be achieved in this manner. Electrical, mechanical, and passive Q-switches are known.

In one type of passive Q-switch, a solid medium contains saturable color centers. A color center is a crystal defect that absorbs light. In a passive Q-switch, the presence of the color centers causes the transmittance of the Q-switch to be low when the energy of the incident light beam is below the saturation intensity of color center absorption. On the other hand, a sufficiently high beam energy causes the color centers to momentarily change or bleach so that the light beam is no longer absorbed.

The beam inside the laser cavity must pass through the Q-switch. Unbleached color centers act to delay the time at which the laser reaches threshold by absorbing a fraction of the growing intracavity field on each pass. When the intensity reaches a value, termed the saturation intensity, which is characteristic of the density and type of color centers, the color centers bleach to a transparent state and the beam is transmitted as a short, giant pulse of energy.

Solid state passive Q-switches are formed of crystals having saturable color centers which function in the manner described. As an example, a known Q-switch of this type is lithium fluoride (LiF), which can have $F_2^-$ color centers produced by gamma irradiation of the crystal. Although such crystals are operable as Q-switches, they have certain disadvantages. The crystals are rather long, typically being about 5 centimeters in length, when used as effective Q-switches. Also, there is some angular beam divergence from the laser, which is undesirable. It has been found previously that the second problem can be partially solved by introducing a distribution of color centers into the Q-switch crystal after gamma irradiation of a plate-like crystal, using ultraviolet laser irradiation through a system of apertures with stops. When the crystal is carefully irradiated in this manner, there is a gradient in the distribution of color centers from the center to the edge of the plate-like crystal. There is a corresponding gradient in transmittance from the center to the edge of the crystal, with the transmittance being greatest in the center. This gradient results in a focusing action that reduces beam angular divergence.

While this approach suggests the possibility of achieving better control of laser beam angular divergence through control of the distribution of color centers in a Q-switch, it is not practical for use in conjunction with long, cylindrically symmetric crystals to produce Q-switches with uniform properties along the axis. It also is crude in implementation, as the achievement of a desired distribution depends upon the use of mechanically stopped apertures to alter a distribution of color centers, and is limited by the diffraction of light through the apertures.

There is a need for some more practical method for introducing distributions of color centers in solid state Q-switch crystals. Desirably, such a method would also allow flexibility in selecting both the concentration and gradient in the color centers, to permit control over transmittance and also permit the Q-switch crystal to be physically shortened. The present invention fulfills this need, and further provides related advantages.

SUMMARY OF THE INVENTION

The present invention resides in a method for producing solid state passive Q-switch crystals having a distribution if saturable color centers, and the crystals made thereby. In such crystals, the radial distribution of color centers, measured from a centerline along which the laser beam is directed, can be readily controlled over a wide range. Both the baseline color center concentration at the centerline and the gradient in color centers can be controllably established. This selectable distribution of saturable color centers reduces the laser beam angular divergence in operation, and also permits a substantial reduction in the physical length of the Q-switch, if desired. Radially varying distributions that are circumferentially uniform can be readily introduced into cylindrical Q-switch crystals, the geometry of most interest in many applications. The production of saturable color centers is readily accomplished by known radiation technologies.

In accordance with the invention, a method for preparing a solid state Q-switch comprises the steps of furnishing a crystal with a system axis in a direction suitable for transmitting a laser beam, the crystal being of a material capable of forming saturable color centers that can be bleached temporarily by sufficiently intense laser light, and irradiating the crystal with electrons in a direction having a component perpendicular to the system axis, to form a distribution of color centers having a radial gradient in the direction perpendicular to the system axis.

The crystal is preferably lithium fluoride (LiF), and is cylindrical in shape with the system axis coinciding with the cylindrical axis. In this form, the crystal can be rotated about its cylindrical axis during irradiation to produce a circumferentially uniform distribution, although the rotation about the system axis can be also be utilized in a noncylindrical crystal. Thus, in accordance with another embodiment of the invention, a method for preparing a solid state Q-switch comprises the steps of furnishing a cylindrical crystal of lithium fluoride, and irradiating the crystal with electrons in a direction having a component perpendicular to the cylindrical axis, to form a distribution of color centers having a radial gradient in the direction perpendicular to the axis. The even distribution about the entire circumference of the cylindrical crystal is attained by rotating the crystal about its axis during electron irradiation.

The gradient in the color centers can be controlled by selecting a particular diameter of the Q-switch crystal, and by controlling the conditions of irradiation. The nature of the crystal itself can also be controlled, by varying impurities, growth method, crystal orientation, and composition. The temperature of irradiation, as well as the energy and dose levels of the electrons, can be varied to control the distribution of color centers. Preferably, the diameter of the Q-switch crystal is on the order of $\frac{1}{2}$ centimeter, the irradiation is conducted at ambient temperature, the energy of the electrons is about 1–2 million electron volts (MeV), and the dose rate is about 10 microamperes per square centimeter. This type of control can be readily achieved in conventional electron irradiation apparatus, such as a Van der Graff generator. However, none of these parameters is critical, and they can be varied to produce particular distributions of color centers.

This method of electron irradiation produces a center-to-periphery radial distribution of saturable color centers. It is also desirable to be able to control the baseline absorption along the system or cylindrical axis, from which the radial distribution departs. By controlling both the baseline and the radial variation of color center concentration, accurate selection of transmission, aperture, and focusing conditions can be made.

To control the baseline level of color centers, the crystal can be irradiated with gamma radiation, either before or after (but preferably after) the electron irradiation. The gamma radiation, as produced from a cobalt-60 source, has a long distance of penetration through solids, and in particular solids such as lithium fluoride used in the Q-switch. A flood gamma irradiation establishes the baseline of color centers throughout the entire crystal. The baseline color center distribution can also be established with electron irradiation along the system or cylindrical axis, which is termed axial irradiation. (The axial electron is to be distinguished from radial electron irradiation in a direction perpendicular to the system or cylindrical axis.) The axial electron irradiation produces a uniform level of color centers over the cross section of the crystal. The concentration of color centers produced by electron irradiation is greater than that produced by gamma irradiation, but is concentrated at the end irradiated. Usually, this concentration of color centers at one or both ends of the crystal is not a problem, as it is the integrated intensity along the system or cylindrical axis that is important. The greater concentration of color centers can be highly desirable in producing a Q-switch crystal of reduced length.

Electrons penetrate only limited distances into crystals such as lithium fluoride, as on the order of about 2 millimeters, with gradually decreasing energy. A decrease in the energy of the electrons reduces their effectiveness in creating color centers. Irradiation of the crystal with a radial electron beam therefore produces the desired distribution of color centers superimposed upon the baseline level established by gamma radiation or axial electron radiation, due to this gradual decrease in energy of the electron beam. This combined radiation approach therefore produces a distribution of color centers that is controllable and yields excellent performance of the Q-switch.

The Q-switch crystals produced by the approach of the invention cannot be fabricated by any other known approach. Liquid or gel Q-switches have saturable absorber mobility that is too high to sustain the desired color center distribution in a regular cell. Cells with lens-like shapes can achieve an effective radial variation in optical density, but then in operation act as lenses, causing excess beam divergence. A controllable, regular radial distribution of color centers cannot be attained with gamma radiation alone. The use of mechanical apertures in combination with ultraviolet radiation results in irregularities in the distribution. There is no known method for obtaining regular radial distributions in cylindrical crystals, using only gamma radiation.

The Q-switch of the invention is used with a pulsed laser. In accordance with this aspect of the invention, a pulsed laser comprises a mirrored laser cavity; a lasing crystal within the cavity; and a passive solid state Q-switch in the optical path of the lasing crystal, the Q-switch being prepared by the method of furnishing a Q-switch crystal with a system axis in a direction suitable for transmitting a laser beam, the Q-switch crystal being of a material capable of forming saturable color centers that can be temporarily bleached by sufficiently intense laser light, and irradiating the Q-switch crystal with electrons in a direction having a component perpendicular to the system axis of the Q-switch crystal, to form a distribution of color centers having a radial gradient in the direction perpendicular to the system axis. Such a laser can be constructed with the other features of the method of fabrication of the Q-switch as described previously.

It will now be appreciated that the method and Q-switches of the invention provide an important advance in the laser art. Controllable distributions of color centers can be introduced into Q-switches. Both the baseline and gradient in color centers can be readily established. Other features and advantages of the invention will be apparent from the following more detailed discussion of the preferred embodiment, taken in conjunction with the accompanying drawings, which illustrate, by way of example, the principles of the invention.

DETAILED DESCRIPTION OF THE PREFERRED EMBODIMENT

Figure 1:
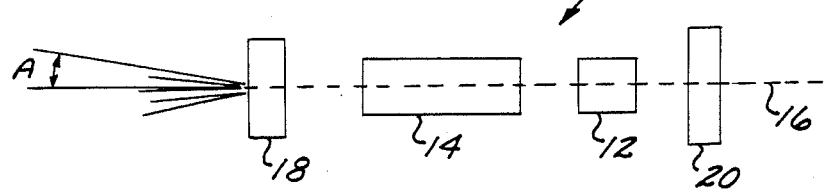
FIG. 1 is a diagrammatic sketch of a laser with a Q-switch.

The use of a Q-switch crystal as prepared by the approach of the present invention is first summarized. FIG. 1 schematically illustrates a pulsed laser system 10, one component of which is a Q-switch 12. The system 10 includes a lasing crystal 14, which can be a neodymium-doped yttrium aluminum garnet (YAG:Nd) crystal that lases at an output wavelength of 1.06 micrometers. Light is generally produced along a system axis 16, and is reflected between two mirrors 18 and 20. The Q-switch 12 has its axis coincident with the system axis 16.

Figure 2:
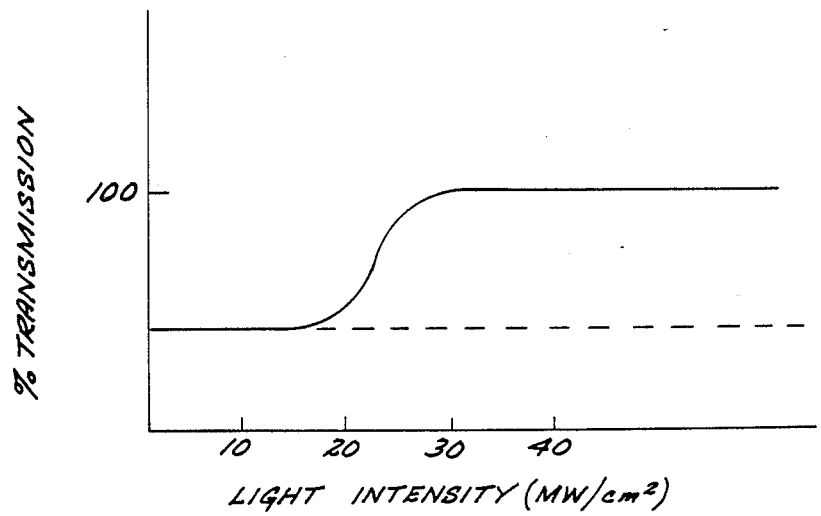
FIG. 2 is a graph of light transmission through a Q-switch.

The Q-switch 12 prevents light from leaving the system 10, when the intensity of the light is less than the bleaching level of the Q-switch, as illustrated in FIG. 2. For low light intensities, generally on the order of about 1 megawatt per square centimeter ($MW/cm^2$) or less for a LiF Q-switch, the transmission of light through the Q-switch is relatively low. For higher light intensities, generally on the order of about 30 megawatts per square centimeter or more for a LiF Q-switch, the transmission of light through the Q-switch is near to 100 percent. There is a gradual transition between the two states as a function of intensity. This transition is caused by the change in state of the color centers, wherein they saturate and bleach, so that light is transmitted under high light intensity conditions. The light intensity therefore builds within the laser system 10 until it exceeds some required level, and then is emitted as a pulse or burst of light. The lasing crystal may be continuously pumped to emit laser light, so the process can be repeated after the color center returns to its resting or "ground" state, a process requiring approximately 70 nanoseconds. That is, the color centers bleach only temporarily, and then return to their lower transmission state. If, as in most high power Nd:YAG lasers, the system is pulsed 10 times per second, the output would be pulses of 30 nanosecond duration spaced by 100 milliseconds.

Figure 3:
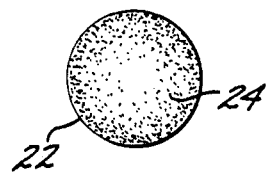
FIG. 3 is an end sectional view of a Q-switch crystal having a radial distribution of color centers.

The present invention provides a method for preparing a solid state crystal 22 for use in a Q-switch 12, wherein there is a radially increasing distribution of color centers 24. The radial distribution is schematically depicted in FIG. 3 as dots representing the color centers 24. (The radial distribution is better illustrated in a semiquantitative manner in FIG. 5, which will be discussed subsequently.)

Figure 4:
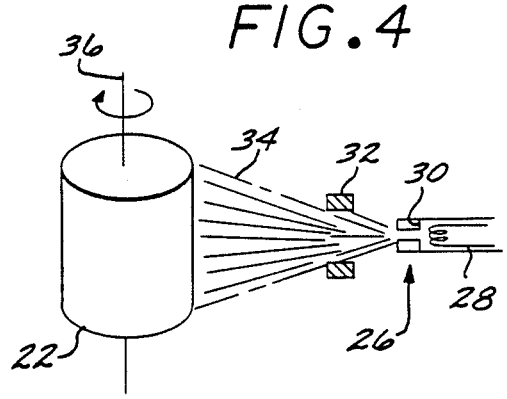
FIG. 4 is a diagrammatic sketch of a cylindrical crystal being irradiated with an electron beam.

The radially increasing distribution, also termed a radial distribution for brevity, is produced by the apparatus illustrated in FIG. 4, and by a process associated therewith. A crystal 22 is placed into an electron-beam irradiation apparatus 26, such as a Van der Graff generator. In this apparatus, electrons are produced from a filament 28 and accelerated, as by a series of electrostatic plates 30. The accelerated beam can be shaped and guided by deflection coils 32, to produce an emitted electron beam 34, wherein the electons have an energy determined by their acceleration and a distribution determined by the deflection coils 32.

The electron beam 34 is directed against the side of the crystal 22, and the crystal 22 is simultaneously rotated about its cylindrical axis 36, which in use coincides with the optical axis and system axis 16. In the preferred irradiation approach illustrated in FIG. 4, the electron beam 34 is exactly perpendicular to the cylindrical axis 36. While this approach yields the best results for a cylindrical crystal such as that illustrated, the electron beam 34 need not be perpendicular to the system axis of the crystal 22. An electron beam directed along the axis of the crystal would not produce the desired type of radial distribution. (However, an electron beam directed along the axis of the crystal can be used to produce a baseline distribution, as described elsewhere herein, and particularly in relation to Example 5.) Alternatively stated, the direction of the electron beam must have at least some component (in the sense of a decomposition of a vector) perpendicular to the crystal system or cylindrical axis, to produce a radial distribution of color centers.

The energy of the electrons in the electron beam 34 is reduced by interactions with the ions in the crystal 22, so that there is a decay in energy with distance into the interior of the crystal 22. The interaction of the electrons with the ions produces color centers, and the greater the energy of the electrons, the more color centers produced. For electrons of 1-2 MeV energy, the energy of the electrons decays to a level insufficient to produce color centers by energetic interactions in about 2 millimeters or so of penetration into the preferred LiF material. However, this penetration depth can be varied by changing the energy of the electrons in the beam 34.

Figure 5:
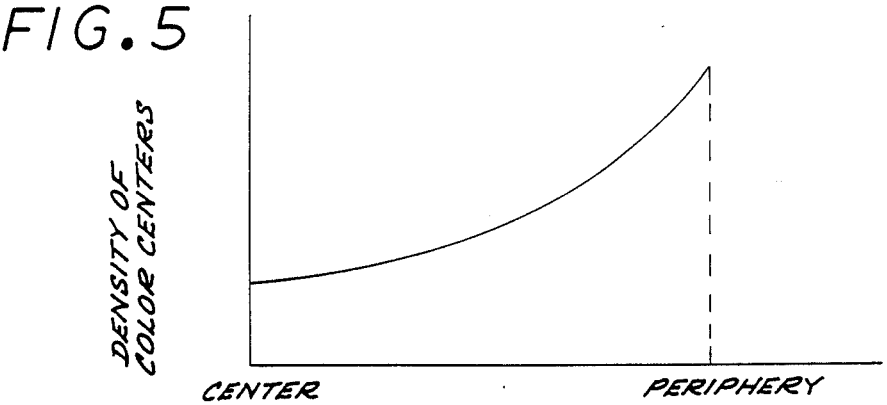
FIG. 5 is a graph of the radial distribution of color centers in a cylindrical crystal.

FIG. 5 illustrates the radially increasing distribution of color centers produced in a crystal 22 by the radial electron irradiation illustrated in FIG. 4. The density of color centers is highest at the edge or periphery of the crystal, and lowest at the centerline. This distribution is circumferentially uniform due to the rotation of the crystal 22 during the irradiation. That is, the distribution shown in FIG. 5 would be generally the same at all angular cuts through the crystal 22 and including the cylindrical axis 36, except for minor variations resulting from crystallographic and electron channeling effects.

The electron irradiation process just described can leave a very low density of color centers near the cylindrical axis 36 of the crystal 22. This type of distribution is not acceptable for most applications. The electron beam irradiation can be used in conjunction with gamma ray radiation or axial electron irradiation to further shape the distribution of color centers, and achieve a higher distribution near the centerline than would be possible with electron irradiation alone.

Figure 6:
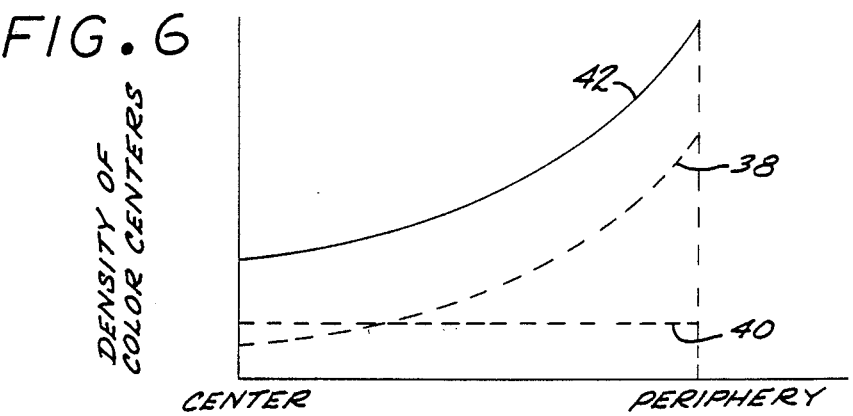
FIG. 6 is a graph of the baseline and radial distribution of color centers in a cylindrical crystal.

In this embodiment, the crystal 22 is first irradiated with electrons to achieve the radial distribution of color centers as illustrated in FIG. 5, and in FIG. 6 as the radial distribution curve indicated by numeral 38. Then the crystal 22 is placed into a gamma radiation source, such as the gamma radiation produced by the radioisotope cobalt-60. The gamma radiation has a very short wavelength, and penetrates through the crystal 22 without losing all of its energy. Some energy is absorbed, however, producing some color centers that are generally uniformly distributed throughout the crystal 22. The generally uniform distribution of color centers is illustrated in FIG. 6 as the baseline distribution curve 40. The total of the curves 38 and 40, the total distribution curve 42, is the total distribution of color centers in the crystal 22. Adjusting the amount of either component 38 and 40, as well as the shape of the radial distribution 38, permits a great deal of flexibility in determining the distribution of color centers in the crystal 22.

The baseline distribution of color centers can also be produced by electron irradiation along the axis 36, using and electron beam that is broad enough to encompass the entire lateral extent of the crystal 22 when viewed along the axis 36 (or that can be scanned to cover the entire lateral extent). The distribution of color centers so produced is concentrated at the end of the crystal 22 irradiated. Their density is sufficiently greater than the density of color centers produced by gamma radiation that the level of the baseline curve 40 is raised by using electron irradiation. The result is that the overall length of the crystal 22 can be made shorter. The density of color centers refers to the integrated density experienced by a light beam travelling along the system or cylindrical axis 36, so that concentrating the color centers at one end of the crystal is acceptable in most applications. Of course, a spatially varying axial electron beam can be used to produce a local radial variation in the color center distribution at the end of the crystal 22, providing yet another way of controlling the overall baseline and radial distribution of color centers in the crystal 22.

The use of electron beam radiation permits the crystal 22 to be shortened in length significantly, making the system 10 more compact. The electron beam radiation is more effective in producing color centers than is gamma radiation. A generally higher density of color centers results, so that a required absorption can be achieved in a shorter distance.

The radial distribution of color centers, resulting from the use of the electron beam irradiation, acts to minimize the angular divergence A of the beam, as illustrated in FIG. 1. Angular divergence is reduced because divergent beams are preferentially absorbed in the higher distribution of color centers near the periphery of the crystal 22. Only the portion of the laser beam directed virtually precisely down the system axis 16 (the cylindrical axis 36 for a cylindrical crystal) will survive the many passes through the crystal 22.

The following examples are intended to illustrate aspects of the invention, and should not be taken as limiting the scope of the invention in any respect.

EXAMPLE 1

A cylindrical LiF crystal having a diameter of ¼ inch and a length of 5 centimeters was irradiated in an electron beam. During irradiation, the crystal was rotated about its cylindrical axis at a rate of about 5 revolutions per minute. Electron beam irradiation was conducted with electrons having energies of about 1–2 million electron volts (MeV), at ambient temperature. The total dose of electrons was 1500 microampere seconds per square centimeter, at a rate of about 10 microamperes per square centimeter. It is known that the decay distance for such electrons in LiF is about 2.5 millimeters, so that the color center distribution reaches about this distance into the crystal. Such a color center distribution could be observed with the unaided eye.

EXAMPLE 2

Figure 7:
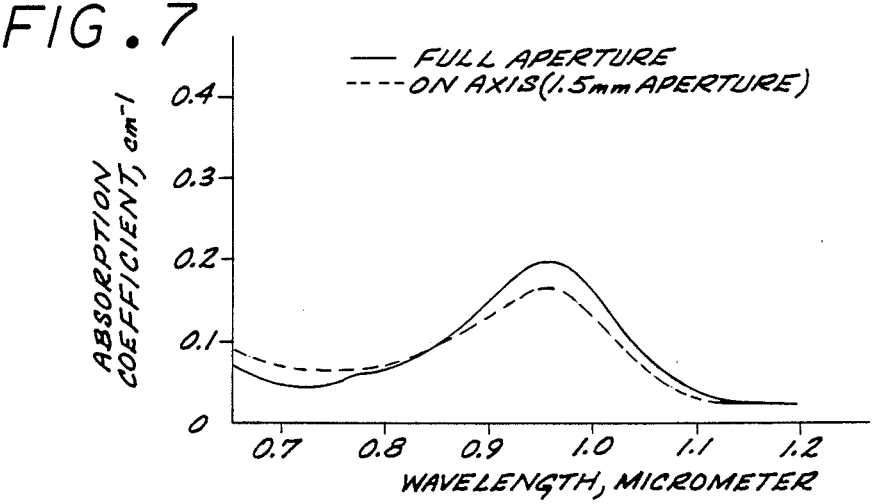
FIG. 7 is a graph of the absorption coefficient of a crystal having a radial distribution of color centers, as a function of wavelength and aperture size.

Transmission through the crystal of Example 1 was measured by passing light therethrough, over a range of wavelengths. The results are shown in FIG. 7. With the available apparatus, it was not possible to measure a radial distribution incrementally. Therefore, integrated radial intensities were measured by passing light through the full diameter of the crystal ("full aperture" in FIG. 7), and through a restrictd region at the center of the crystal ("on axis" in FIG. 7) by placing a 1.5 millimeter diameter aperture on each end of the crystal during the measurement.

As shown in FIG. 7, at the 1.06 micrometer wavelength of interest for use of the crystal with a YAG:Nd laser, the calculated absorption coefficient of the light was greater for the full aperture beam than for the on axis beam. This result means that the absorption near the periphery of the crystal is greater than the absorption near the center, the desired result.

EXAMPLE 3

A prismatic LiF crystal of size 2 millimeters by 10 millimeters by 10 millimeters was irradiated at ambient temperature with a gamma radiation from a cobalt-60 source to a total dose of from 0 to 100 megarads, at a rate of 1.5 megarads per hour. A generally uniform array of color centers was produced, as was verified by visual inspection. The absorption coefficient of light was measured, and was found to increase with increasing dosage.

EXAMPLE 4

Electron beam and gamma radiation treatments were combined to establish a baseline distribution and a radial distribution in a single LiF crystal. The LiF crystal as described in Example 1 was first irradiated with electron beam irradiation, as described in Example 1, and then with gamma irradiation, as described in Example 3. The result was a distribution of color centers such as depicted in the graph of FIG. 6. The effects of such irradiation treatments are close to additive when gamma irradiation is performed after electron irradiation, rather than in the reverse order.

EXAMPLE 5

It is possible to combine successive electron beam irradiation treatments to obtain distributions of color centers of the type illustrated in FIG. 6. A crystal can be irradiated with electrons in the radial direction to establish a radial distribution, as described in Example 1. Either before or after the radial irradiation, the same crystal is subjected to electron irradiation parallel to the system or cylindrical axis, termed an axial irradiation, preferably using an electron beam having a size at least as large as the lateral extent of the crystal, to achieve a uniform distribution of color centers over the entire cross section of the crystal. (In FIG. 4, the first or radial irradiation treatment would be perpendicular to the axis 36, as shown, and the second or axial electron irradiation treatment would be parallel to the axis 36.)

This dual electron irradiation treatment offers an important advantage over combined electron and gamma radiation. The substitution of the axial electron irradiation for the gamma irradiation results in greater production of color centers. The color centers produced by the axial electron irradiation are confined to the end of the crystal, due to the decay in the electron energy. This localization of these color centers is not a problem, as it is the integrated effect of the color centers parallel to the axis of the crystal that is important. With the greater concentrations of color centers possible using this approach, the Q-switch crystal can be made shorter, a further advantage.

The electron beam irradiation of Q-switches permits the development of a radially increasing distribution of color centers. This distribution reduces angular divergence of the laser beam, and also permits the Q-switch to be physically shortened. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a solid state Q-switch, comprising the steps of:

furnishing a cylindrical crystal having a center axis and a periphery, and a system axis in a direction suitable for transmitting a laser beam, the crystal being of a material which forms saturable color centers that are temporarily bleached by sufficiently intense laser light; and irradiating the crystal with electrons in a direction having a component perpendicular to the system axis of the crystal, to form a distribution of color centers that is highest at the periphery of the crystal, and lowest at its center axis, having a radial gradient in the direction perpendicular to the system axis, and such that a uniform radial distribution is achieved which acts to minimize beam divergence.

2. The method of claim 1, wherein the crystal is LiF.

3. The method of claim 1, wherein said step of irradiating includes the substeps of:

supporting the crystal in a beam of electrons, and rotating the crystal about the system axis to create a circumferentially uniform distribution of color centers.

4. The method of claim 1, wherein the electrons in said step of irradiating have an energy of from about 1 to about 2 million electron volts.

5. The method of claim 1, including the further step of irradiating the crystal with gamma radiation to establish a base level of color centers, upon which is imposed the additional gradient created in said step of irradiating with electrons, said step of irradiating with gamma radiation to occur either before or after said step of irradiation with electrons.

6. The method of claim 1, including the further step of irradiating the crystal with electrons in a direction parallel to the system axis.

* * * * *